(No Model.)

L. C. RASMUSSEN.
THILL COUPLING.

No. 466,716. Patented Jan. 5, 1892.

Witnesses:

Inventor
Louis C. Rasmussen

UNITED STATES PATENT OFFICE.

LOUIE C. RASMUSSEN, OF SAN FRANCISCO, CALIFORNIA.

THILL-COUPLING.

SPECIFICATION forming part of Letters Patent No. 466,716, dated January 5, 1892.

Application filed December 12, 1890. Serial No. 374,438. (No model.)

*To all whom it may concern:*

Be it known that I, LOUIE C. RASMUSSEN, a citizen of the United States, residing in the city and county of San Francisco, State of California, have invented certain new and useful Improvements in Thill-Couplings, of which the following is a specification.

My invention has for its object, mainly, to dispense with or avoid the use of anti-rattling devices, such as rubber blocks and springs, and to secure a close joint or connection between the two parts of these couplings, in which the loose play arising from wear of the parts can be taken up as often as required.

The invention consists in certain novel construction and combination of thill-iron and coupling, as hereinafter fully described, and pointed out in the claim.

The manner of constructing and combining the parts of my improved coupling will be understood from the following description and the accompanying drawings, which are therein referred to by letters.

Figure 1:
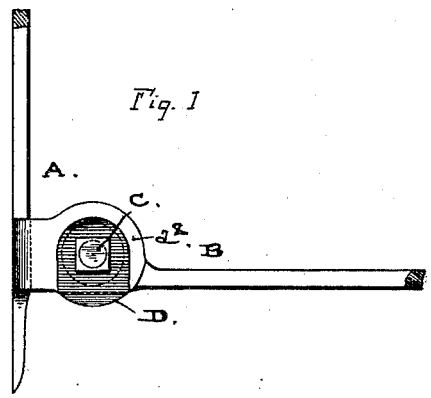
Figure 4:
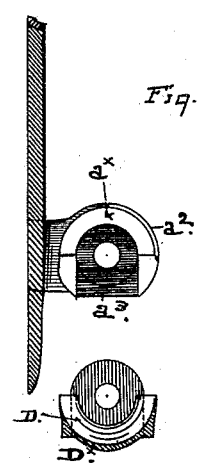
Figure 2:
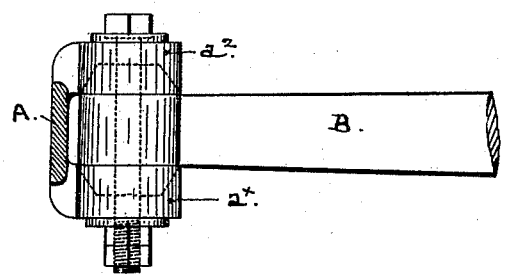
Figure 5:
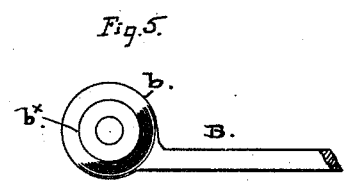
Figure 3:
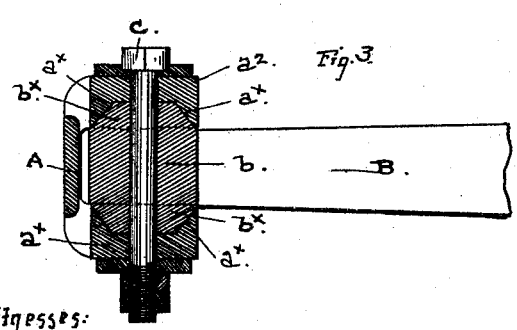
Figure 6:
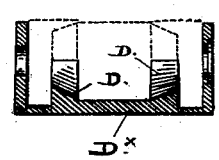

Figure 1 is a side view of the coupling connected by the coupling pin or bolt. Fig. 2 is a top view of the same figure. Fig. 3 is a longitudinal section taken horizontally through the parts of the joint. Fig. 4 is a vertical section through the part having the lugs or knuckles. Fig. 5 is an end view of the thill-iron. Fig. 6 is a view of the segmental filling-piece in detail.

The same letters of reference are used to denote corresponding parts in the several figures of the drawings.

A indicates the part carrying the lugs or ears between which the knuckle of the thill-iron or other part B is inserted.

C is a pin or screw-bolt that fastens the two parts together. These two parts are secured to the thill and the axle in the usual way.

The novel points or features in this improved coupling consist, mainly, in forming conically-socketed bearing-surfaces $a^x$ $a^x$ in the inner sides of the two lugs or knuckles $a^2$ and forming the ends $b^x$ of the knuckle or eye $b$ correspondingly conical to fit closely into the socket. Provision is made for inserting these conical ends into the socket between the lugs by slotting or cutting away the lugs from beneath. Into the aperture in each lug is fitted a block or segmental filling-piece of suitable shape to fill the space and produce a continuous socket or bearing-surface all around the conical end. These blocks are kept in place by a strap-plate having turned-up ends to set over the outer sides of the lugs and slotted or provided with openings for the bolt to pass through. The openings $a^3$ in the lugs are of suitable size to let in the conical ends, and the filling-blocks D D are usually formed in one piece with the plate $D^x$, as illustrated in Figs. 4 and 6. The plate can be countersunk to take the head of the bolt. As thus constructed the knuckle of the thill-iron has a long and close bearing in the socket of the other part, which takes off the strain from the bolt and prevents vertical as well as lateral play. The wear of the parts is taken up by simply tightening the bolt.

Having thus fully described my invention, what I claim, and desire to secure by Letters Patent, is—

In a thill-coupling, a clip or part for attachment to the axle, having conically-socketed ends and a cut-away portion on the end or side, as described, in combination with a thill-iron knuckle having conical ends for insertion into the socketed clip and a filling-piece to fit the cut-away portion of the clip and provided with end pieces fitting over the ends of the clip, and a bolt uniting the filling-piece, clip, and knuckle, as set forth.

In testimony that I claim the foregoing I have hereunto set my hand and seal.

LOUIE C. RASMUSSEN. [L. S.]

Witnesses:
EDWARD E. OSBORN,
CHAS. E. KELLY.